United States Patent
Kobayashi

(10) Patent No.: US 6,825,899 B2
(45) Date of Patent: Nov. 30, 2004

(54) LIQUID CRYSTAL DISPLAY DEVICE IN WHICH GENERATION OF MOIRE FRINGES IS PREVENTED

(75) Inventor: Masakazu Kobayashi, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 153 days.

(21) Appl. No.: 09/794,477

(22) Filed: Feb. 26, 2001

(65) Prior Publication Data

US 2001/0017678 A1 Aug. 30, 2001

(30) Foreign Application Priority Data

Feb. 29, 2000 (JP) .................................. 2000-054648

(51) Int. Cl.[7] .............................................. G02F 1/1335
(52) U.S. Cl. ........................................ 349/106; 63/113
(58) Field of Search ........................... 349/106, 63, 113

(56) References Cited

U.S. PATENT DOCUMENTS

| | | | |
|---|---|---|---|
| 5,841,496 A | 11/1998 | Itoh et al. | 349/113 |
| 6,151,089 A * | 11/2000 | Yang et al. | 349/113 |
| 6,340,999 B1 * | 1/2002 | Masuda et al. | 349/63 |
| 6,507,378 B1 * | 1/2003 | Yano et al. | 349/63 |

FOREIGN PATENT DOCUMENTS

| | | | |
|---|---|---|---|
| EP | 0 940 706 A1 | | 9/1999 |
| EP | 0 942 228 A | | 9/1999 |
| JP | 407261029 A | * | 10/1995 |
| JP | 11-84380 | | 3/1999 |
| JP | 2000-019330 | | 1/2000 |
| JP | 2000-162979 | | 6/2000 |

* cited by examiner

Primary Examiner—Huyen Ngo
(74) Attorney, Agent, or Firm—Brinks Hofer Gilson & Lione

(57) ABSTRACT

A liquid crystal display device is disclosed that provides improved color image quality of the display screen by preventing the generation of moiré fringes, thereby realizing an improvement in color clarity, a reduction in color inconsistency, and clearness in color separation. The liquid crystal display device includes a liquid crystal display module in which a liquid crystal layer and a color filter are formed between a pair of opposing transparent substrates and a front light is mounted to the front side of the liquid crystal display module. The color filter has a stripe pattern which is substantially perpendicular to the stripe pattern of the front light.

28 Claims, 6 Drawing Sheets

US 6,825,899 B2

LIQUID CRYSTAL DISPLAY DEVICE IN WHICH GENERATION OF MOIRE FRINGES IS PREVENTED

BACKGROUND OF THE INVENTION

1. Field of the Invention

The present invention relates to a liquid crystal display device and, in particular, to a liquid crystal display device suitable for use in a reflection type liquid crystal display device such as an STN type color liquid crystal display device utilizing the STN (super-twisted nematic) effect.

2. Description of the Related Art

A liquid crystal display device contains a liquid crystal module in which a liquid crystal layer is formed between transparent substrates such as two glass substrates. One of the conventional types of liquid crystal display devices is a light reception type (non-light-emission type) flat (flat panel) display device utilizing changes in the optical natures of a medium. This liquid crystal display device is of a transmission type in which a backlight is provided on the back side, a reflection type in which a reflection plate is provided that reflects light impinging upon the front side, and a semi-transmission type which functions as both transmission type and reflection type.

In particular, in business machines and apparatuses for home use, a simple matrix structure reflection type liquid crystal display device is used because the element construction and the driving mechanism are both simple and the cost is low.

FIG. 4 is a partially cutaway perspective view showing an example of the conventional simple matrix structure STN reflection type liquid crystal display device. In this reflection type liquid crystal display device 1, a pair of glass substrates (transparent substrates) 2 and 3 are opposed to each other. A phase difference plate 4 and a polarizing plate 5 are sequentially formed on the upper surface of the glass substrate 2 (which serves as the upper substrate). An insulating layer 6 consisting of $SiO_2$ or the like, a transparent electrode 7, and an orientation layer 8 are sequentially formed on the lower side of the glass substrate 2. A reflection layer 9 consisting of a metal layer, a stripe-shaped color filter 10, a flattening layer 11 making the upper surface of the color filter 10 a flat surface, an insulating layer 12 consisting of $SiO_2$ or the like, a transparent electrode 13 consisting of an ITO layer, a NESA layer or the like, and an orientation layer 14 are sequentially formed on the glass substrate 3 (which serves as the lower substrate). A liquid crystal layer 15 is formed between the orientation layers 8 and 14 to provide a liquid crystal display module 16.

Above this liquid crystal display module 16, front lights 19 are formed at fixed intervals. The front lights 19 include a large number of grooves 18 having a substantially V-shaped sectional configuration that is of a stripe pattern formed on the upper surface of the glass substrate (transparent substrate) 17.

In this reflection type liquid crystal display device 1, as shown in FIG. 5, the angle θ made by the stripe-shaped color filter 10 and the grooves 18 of the front lights 19 is set to be in the range of 0 to 50 degrees.

Further, in an active matrix type liquid crystal display device using a TFT (thin film transistor) which is another example of a reflection type liquid crystal display device, the angle made by the stripe pattern of the color filter and the stripe pattern of the front lights is set to be 22.5 degrees.

Incidentally, in the above-described reflection type liquid crystal display device, the stripe-shaped color filter 10 is inclined by the angle θ with respect to the grooves 18 of the front lights 19, so that when light L is projected onto the liquid crystal layer 15 from the front light 19, a fringe-like diffraction image, that is, a moiré fringe M, is generated, resulting in a deterioration in the color image quality.

In these moiré fringes M, the inter-fringe distance is larger than the width of the groove 18, so that, in particular, when generated in a color image, the color image is greatly deteriorated due to these moiré fringes M, and in some cases, it is completely impossible to obtain a clear color display.

In this way, the moiré fringes M greatly influence the hue, brightness, saturation, etc. of the liquid crystal display module, so that they lead to generation of problems such as a deterioration in clarity in color display, generation of color inconsistency, and unclearness in color separation, resulting in a deterioration in the color image quality.

SUMMARY OF THE INVENTION

The present invention has been made in view of the above problem Accordingly, it is an object of the present invention to prevent the generation of moiré fringes to thereby realize an enhancement in color clarity, a reduction in color inconsistency, clearness in color separation, etc., and provide a liquid crystal display device with an improved color image quality of the display screen.

To achieve the above object, in accordance with the present invention, a liquid crystal display device is provided that comprises a liquid crystal display module in which a liquid crystal layer and a color filter are formed between a pair of opposing transparent substrates, and a front light mounted to the front side of the liquid crystal display module. In addition, the stripe pattern of the color filter is substantially perpendicular to the stripe pattern of the front light.

In accordance with the present invention, in the liquid crystal display device the angle made by the stripe pattern of the color filter and the stripe pattern of the front light is in the range of 90±10 degrees.

Further, in accordance with the present invention, in the liquid crystal display device the stripe pattern of the color filter comprises a plurality of stripe-shaped color filters arranged in the short side direction and the stripe pattern of the front light comprises a plurality of grooves formed in the main surface thereof.

In this liquid crystal display device, the stripe pattern of the color filter is substantially perpendicular to the stripe pattern of the front light. Thus, even when light is projected from the front light toward the liquid crystal layer, stripe-like diffraction images (i.e. moiré fringes) will not be generated.

In the liquid crystal display device according to the above embodiment, moiré fringes will not be generated or visually recognized because the angle made by the stripe pattern of the color filter and the stripe pattern of the front light is in the range of 90±10 degrees. If the angle made by the stripe pattern of the color filter and the stripe pattern of the front light is out of this range, moiré fringes will be generated and visually recognized, thereby resulting in a substantial deterioration in the color image quality of the display screen.

In a liquid crystal display device according to an alternative embodiment, moiré fringes will not be generated or visually recognized when an optimum angle exists between the stripe pattern of the color filter and the stripe pattern of the front light. In this case, the optimum angle may be determined by a combination of a width of the color filter, a distance between the color filter and an adjacent color filter, a width of each of the grooves, and a distance between adjacent grooves.

Thus, moiré fringes will not influence the color hue, brightness, saturation, etc. of the liquid crystal display module and no deterioration in the clarity in color display, generation of color inconsistency, unclearness in color separation, etc., will exist. This makes it possible to improve the color image quality of the display screen.

DESCRIPTION OF THE PREFERRED EMBODIMENTS

An embodiment of the liquid crystal display device of the present invention will now be described with reference to the drawings.

Figure 1:
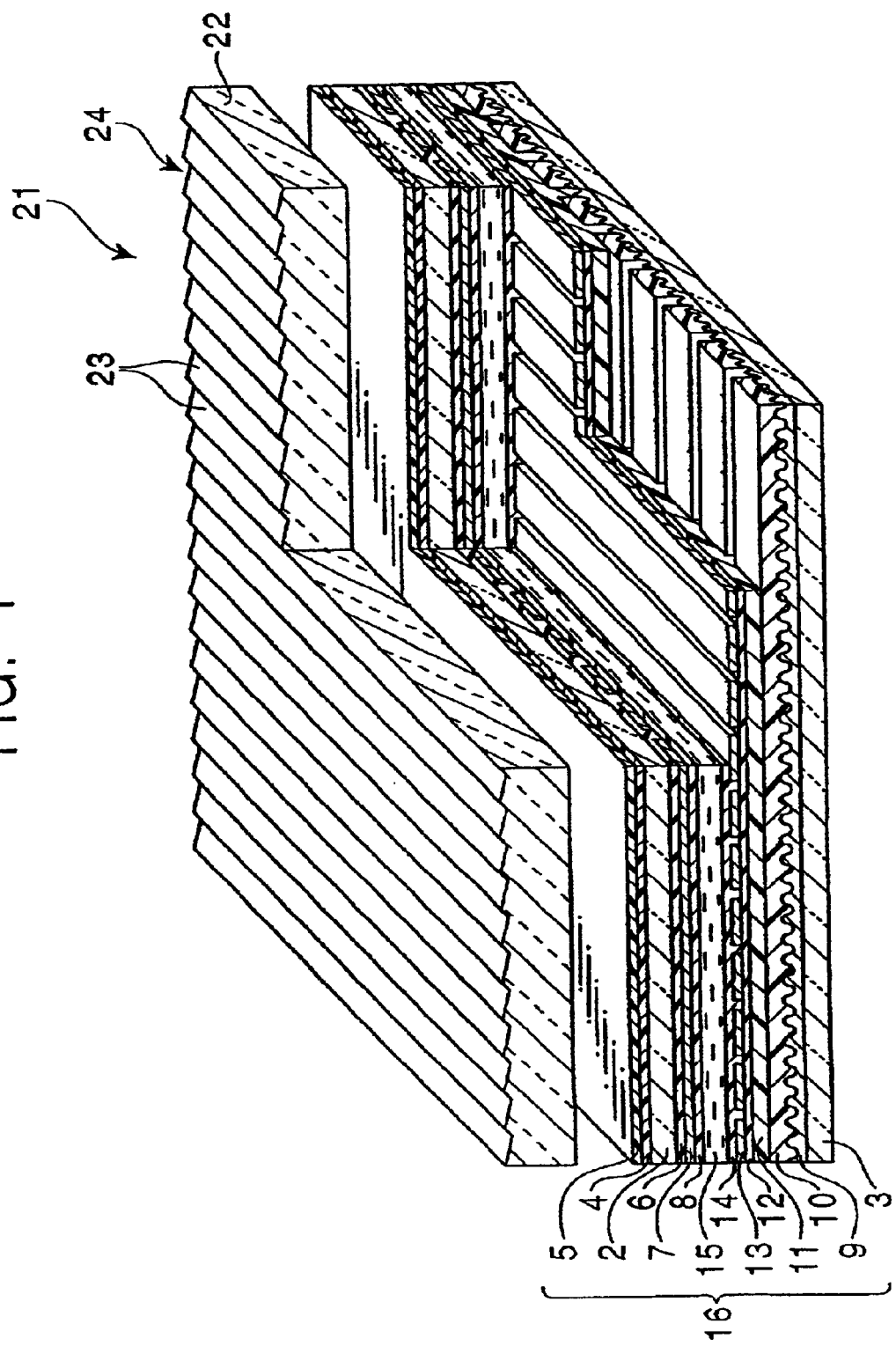
FIG. 1 is a partially cutaway perspective view of an STN type reflection type liquid crystal display device according to an embodiment of the present invention.
Figure 4:
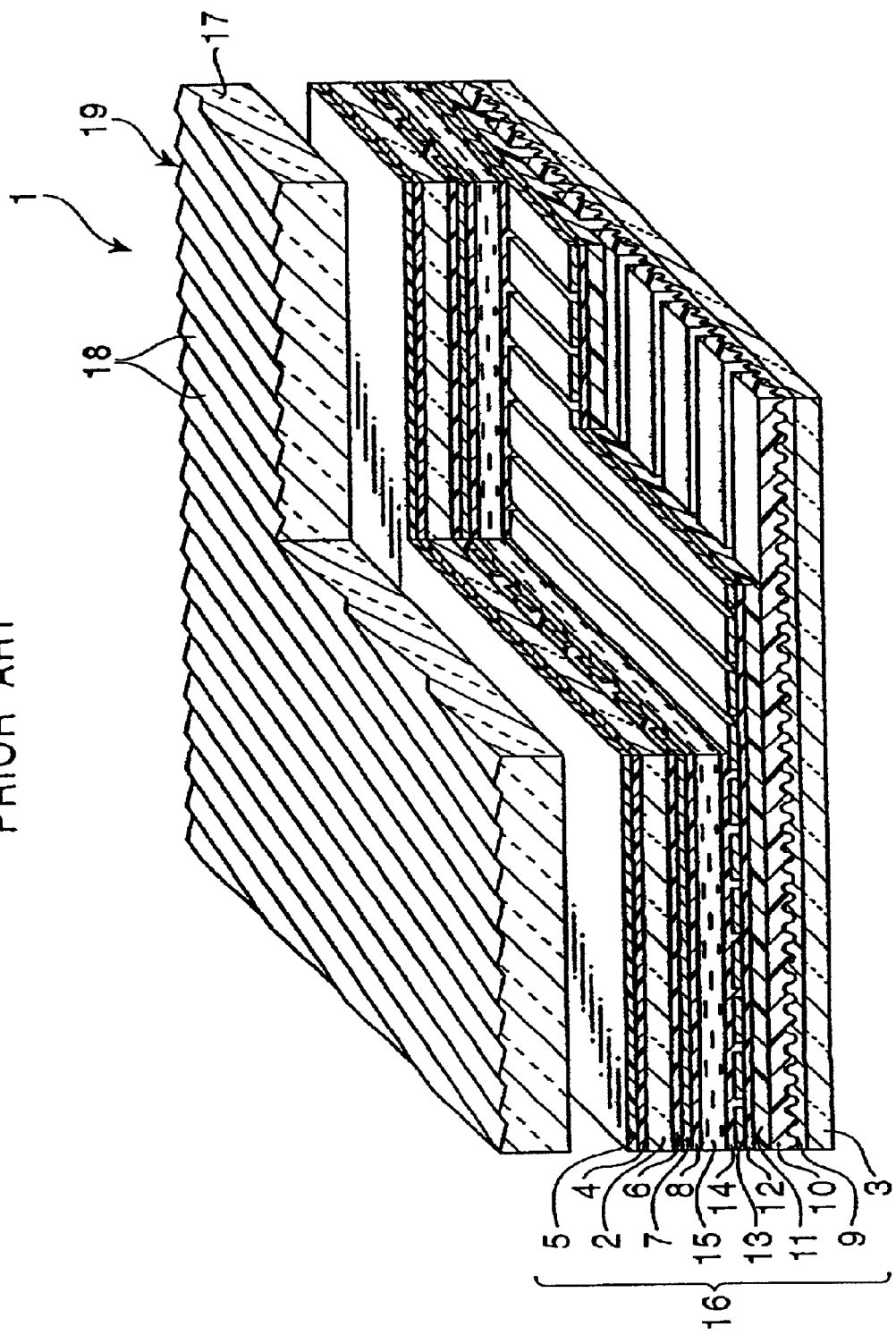
FIG. 4 is a partially cutaway perspective view showing an example of a conventional simple matrix structure STN type reflection type liquid crystal display device.
Figure 5:
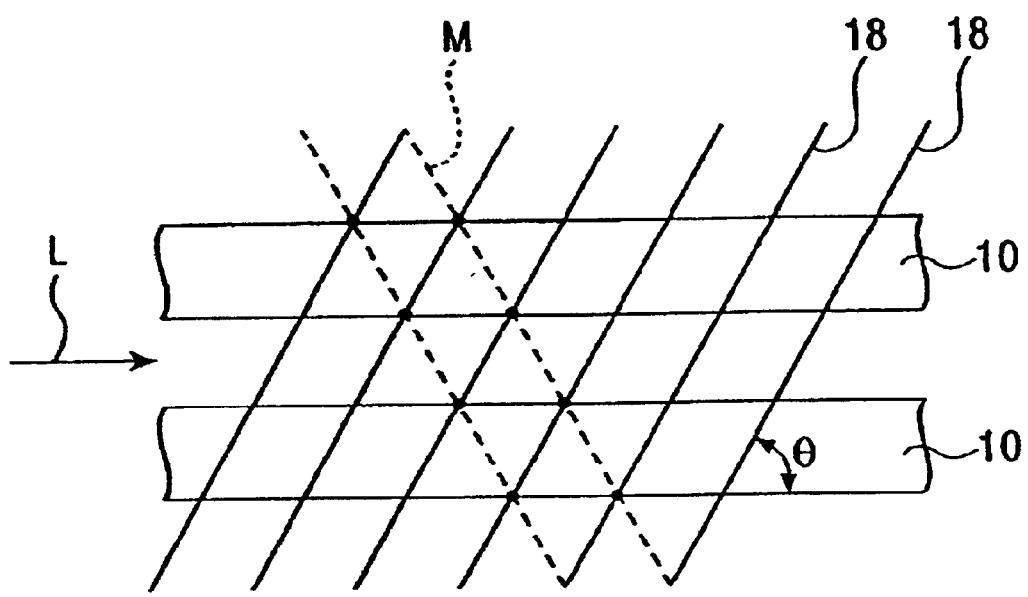
FIG. 5 is a schematic diagram showing the angle made by the stripe-shaped color filter and the front light groove of the conventional reflection type liquid crystal display devices.

FIG. 1 is a partially cutaway perspective view of an STN type reflection type liquid crystal display device 21 according to an embodiment of the present invention. In FIG. 1, the components that are the same as those of the liquid crystal display device shown in FIG. 4 are indicated by the same reference numerals.

In this reflection type liquid crystal display device 21, a liquid crystal layer 15 is formed between a pair of opposing glass substrates 2 and 3. A front light 24 in which a large number of grooves 23 having a substantially V-shaped sectional configuration in stripe pattern is mounted to the upper surface of the glass substrate 22. The glass substrate 22 opposes the upper portion of the liquid crystal display module 16, in which a plurality of stripe-like color filters 10 are arranged in the short side direction.

Figure 2:
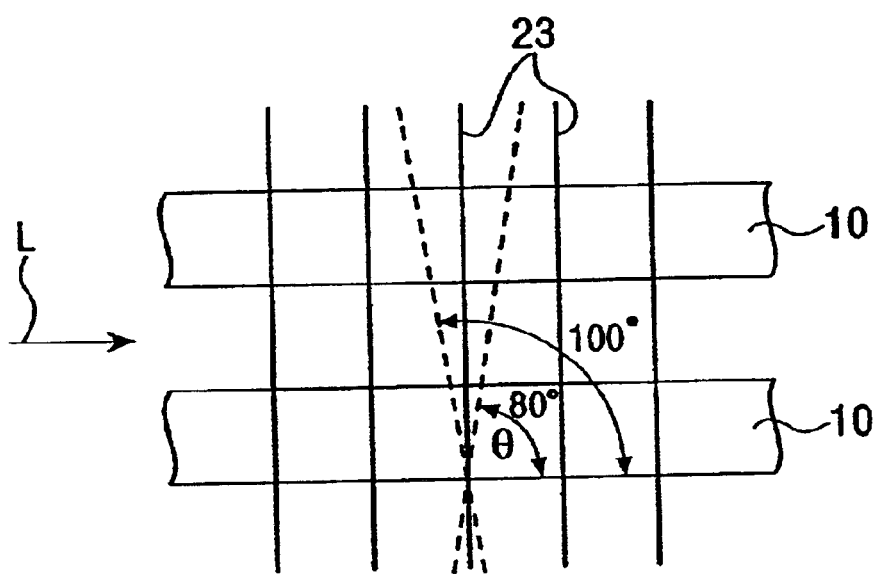
FIG. 2 is a schematic diagram showing the angle made by the stripe-shaped color filter and the front light groove of the reflection type liquid crystal display device according to an embodiment of the present invention.

The angle θ made by the stripe-like color filters 10 and the grooves 23 of the front light 24 is, as shown in FIG. 2, substantially a right angle or, preferably, in the range of 90±10 degrees (80 to 100 degrees).

Figure 3:
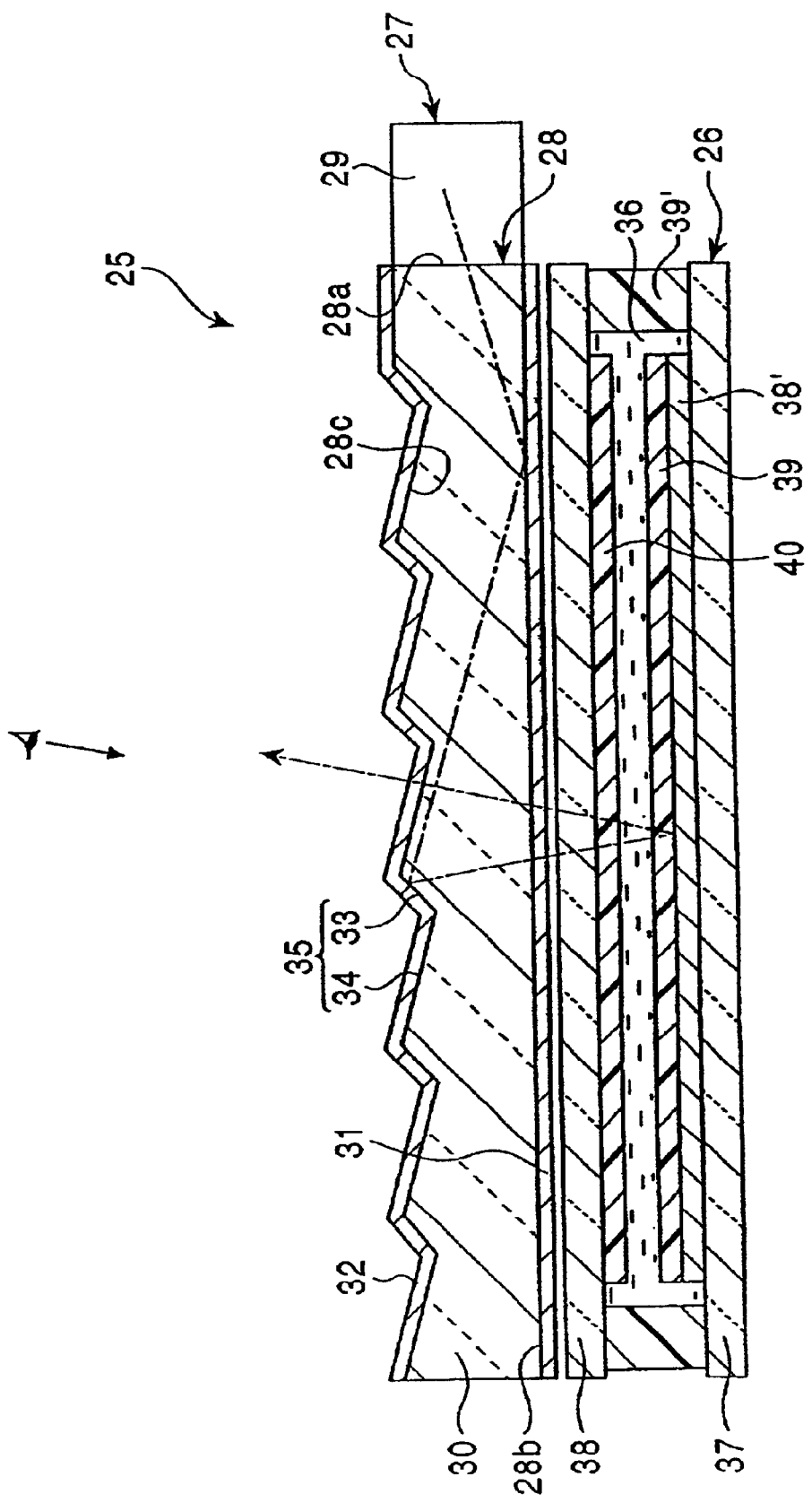
FIG. 3 is a sectional view of a liquid crystal display device provided with a front light.

FIG. 3 is a sectional view of a liquid crystal display device provided with a front light (surface light emitting device). In this diagram, the liquid crystal display device 25 substantially comprises a liquid crystal display unit 26, and a front light 27 arranged on the front side of the liquid crystal display unit 26 and adapted to illuminate the liquid crystal display unit 26. The front light 27 comprises a transparent light guide plate 28 and a light source 29, the light source 29 being arranged on the side end surface 28a for guiding light to the light guide plate 28.

The light guide plate 28 is arranged on the front side of the display region of the liquid crystal display unit 26 (the upper surface side in FIG. 3) and adapted to apply the light from the light source 29 to the liquid crystal display unit 26. It comprises a base member 30 consisting of a transparent acrylic resin or the like and transparent reflection preventing layers 31 and 32 provided on the lower surface and the upper surface of the base member 30. As shown in FIG. 3, the lower surface of the light guide plate 28 (the surface opposed to the liquid crystal display unit 26) is a light output surface 28b outputting light for illuminating the liquid crystal display unit 26. The upper surface (outer surface of the light guide plate 28) on the opposite side of the output surface 28b is a reflection surface 28c for changing the direction of the light propagated through the interior of the light guide plate 28.

As the material of the base member 30 of the light guide plate 28, it is possible to use, apart from acrylic resin, transparent resin material such as polycarbonate type resin or epoxy type resin, or glass.

The output surface 28b of the light guide plate 28 is a surface opposed to the liquid crystal display unit 26 and adapted to output light for illuminating the liquid crystal display unit 26. It is a smooth surface whose surface roughness (Ra) is not more than 10 nm. On this output surface 28b, a reflection preventing layer 31 is provided for preventing the reflection of light.

A plurality of stripe-like wedge-shaped grooves 35 are formed on the reflection surface 28c. The plurality of stripe-like wedge-shaped grooves 35 consist of a first inclined surface portion 33 inclined with respect to the output surface 28b in order to change the light propagating direction by reflecting the light propagated through the interior of the light guide plate 28, and a second inclined surface portion 34 connected to the first inclined surface portion 33. The first inclined surface portion 33 has a steeper inclination angle than the second inclined surface portion 34. Further, a reflection preventing layer 32 for preventing reflection of light is provided on the reflection surface 28c.

While in the light guide plate 28 shown in FIG. 3 the configuration of the reflection surface 28c is a triangular wave configuration in which wedge-shaped grooves 35 are successively formed, it is also possible to adopt a stripe-like configuration in which there is provided between adjacent grooves 35 a flat portion substantially parallel to the output surface 28b, with successive trapezoidal forms, a configuration in which a plurality of stripe-like recesses constituting a part of a spherical surface are formed on the reflection surface 28c, or a stripe configuration in which there are formed a plurality of stripe-like protrusions constituting a part of a spherical body.

Figures 6, 7:
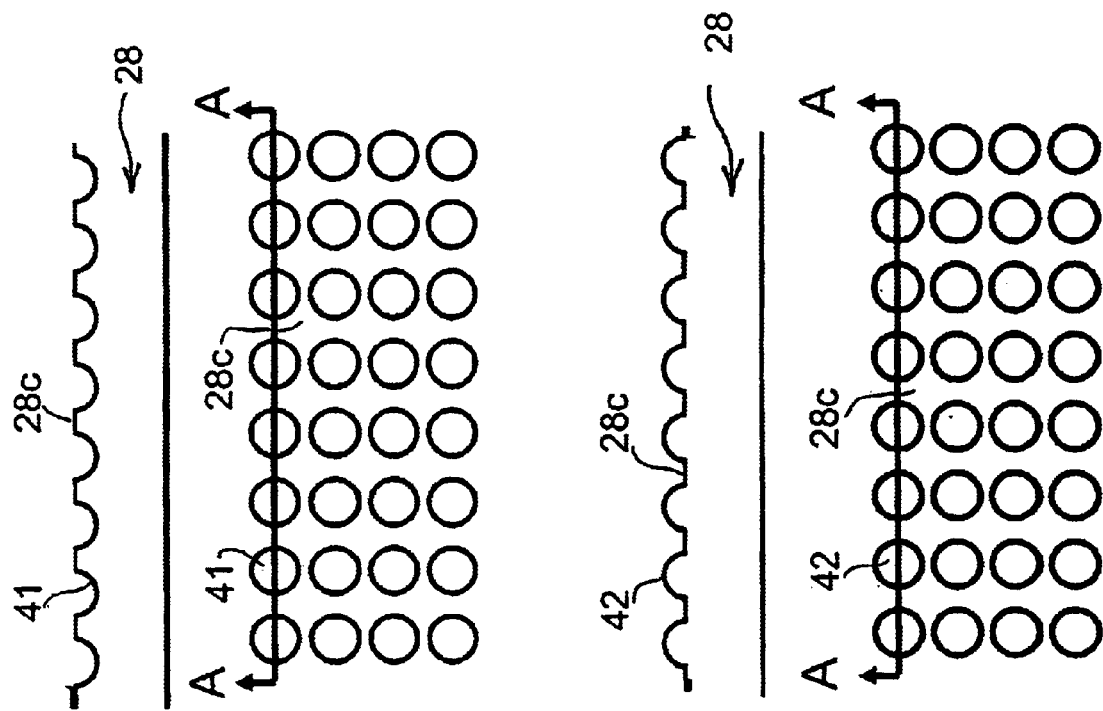
FIG. 6 is a sectional view of a stripe groove configuration of the light guide plate comprising a plurality of recesses.
FIG. 7 is a sectional view of a stripe groove configuration of the light guide plate comprising a plurality of protrusions.

FIG. 6 shows the formation of a stripe configuration consisting of a plurality of recesses 41 in the reflecting surface 28c of the of the light guide plate 28. FIG. 7 shows the formation of a stripe configuration consisting of plurality of protrusions 42 in the reflecting surface 28c of the of the light guide plate 28.

The liquid crystal display unit 26 comprises a first substrate 37 holding the liquid crystal layer 36 and consisting of glass or the like, and a second substrate 38 joined by a seal material 39'. Sequentially stacked on the surface on the liquid crystal layer side of the first substrate 37 are a reflection layer 38' including a metal reflection film, a color filter layer 39, an orientation layer, etc. Formed on the surface on the liquid crystal layer side of the second substrate 38 are an orientation layer 40, etc. Thus, the liquid crystal display unit 26 is a reflection type liquid crystal display unit provided with a reflection layer 38' for reflecting light coming from outside. The color filter layer 39 is formed as a plurality of stripes such that it is substantially perpendicular to the stripe configuration of the grooves 34 in the longitudinal direction of FIG. 3.

The reflection layer 38' is formed by a metal reflection layer, consisting of aluminum or silver or the like The reflection layer 38' is formed, for example, by sputtering the metal reflection layer on an organic layer consisting of acrylic resin or the like. The organic layer has a surface on which protrusions and recesses are formed. The reflection layer 38' is flattened by the color filter layer 39 and covers the reflection layer and the organic layer. Alternative means (other than sputtering) may also be used to coat the organic layer with the metal reflection layer.

In this liquid crystal display device, the stripe-like color filter 10 is substantially perpendicular to the grooves 23 of the front light 24, preferably, the angle range is 90±10 degrees. Thus, even when light L is projected from the front light 24 toward the liquid crystal layer 15, moiré fringes will not be generated on the color image, and the color image quality will not be deteriorated. Thus, deterioration in the color clarity in the color display, generation of color inconsistency, and unclearness of color separation will not occur. This creates moiré color image which is clearer, free of color, with the hues being clearly separated.

While an embodiment of the reflection type liquid crystal display device of this invention has been described with reference to the drawings, the specific construction is not restricted to that of this embodiment. Modifications in design, etc. are possible without departing from the scope of the present invention.

For example, it is sufficient that the angle θ made by the stripe-shaped color filter 10 and the grooves 23 of the front light 24 is set to be in the range of 90±10 degrees. Specifically, an optimum angle θ is appropriately set taking into consideration the width of the stripe-like color filter 10, the distance between one of the color filters 10 and the adjacent color filter 10, the width of the grooves 23 of the front light 24 and the distance between one of the grooves 23 and the adjacent groove 23 so that moiré fringes are not generated.

Further, while in the above embodiment the stripe pattern of the color filter is the stripe-like color filter 10 a plurality of which are arranged in the short side direction, and the stripe pattern of the front light is the substantially V-shaped grooves 23 formed on the upper surface of the glass substrate 22, these are only given as and example of the stripe pattern of the color filter and the stripe pattern of the front light. They can be realized in various configurations according to the kind of the liquid crystal display device.

Further, while in the above-described embodiment an STN type reflection type liquid crystal display device is given, it is only necessary for the construction of this reflection type liquid crystal display device to be such that the stripe pattern of the color filter is substantially perpendicular to the stripe pattern of the front light. Apart from the STN type reflection type liquid crystal display device, the present invention is also applicable, for example, to an active matrix type liquid crystal display device using TFT elements.

As described above, in the liquid crystal display device of the present invention, the stripe pattern of the color filter is substantially perpendicular to the stripe pattern of the front light, so that even when light is projected toward the liquid crystal layer from the front light, no moiré fringes are generated, making it possible to prevent the light interference from influencing the hue, clarity, saturation, etc. of the color of the liquid crystal module. Thus, it is possible to prevent deterioration in the color clarity in the color display, generation of color inconsistency, and unclearness of color separation, and thereby improving the color image quality of the display screen.

Further, the angle made by the stripe pattern of the color filter and the stripe pattern of the front light is in the range of 90±10 degrees, whereby it is possible to reliably prevent the generation of moiré fringes and further improving the color image quality of the display screen.

Due to the above arrangement, it is possible to prevent the generation of moiré fringes, and to realize an improvement in color clarity, a reduction in color inconsistency, clearness in color separation, etc., thereby providing a liquid crystal display device capable of improving the color image quality of the display screen.

What is claimed is:

1. A liquid crystal display device comprising a liquid crystal display module including a front side, a liquid crystal layer, a color filter having a stripe pattern, a pair of opposing transparent substrates, and a front light having a stripe pattern, the liquid crystal layer and the color filter formed between the pair of opposing transparent substrates, and the front light mounted to the front side of the liquid crystal display module, wherein an angle made by the stripe pattern of the color filter and the stripe pattern of the front light is in the range of 90±10 degrees.

2. A liquid crystal display device according to claim 1, the stripe pattern of the color filter comprising a plurality of stripe-shaped color filters arranged in a short side direction, and the stripe pattern of the front light comprising a plurality of grooves formed in a main surface thereof.

3. A liquid crystal display device according to claim 2, wherein each groove has a first inclined surface portion having a first length and a second inclined surface portion having a second length and the first length is smaller than the second length.

4. A liquid crystal display device according to claim 1, the front light further comprising a transparent light guide plate having a side end surface and a light source arranged on the side end surface.

5. A liquid crystal display device according to claim 4, further comprising a first transparent reflection preventing layer disposed on a surface of the front light opposing the grooves to reflect light directly from the light source towards the grooves and away from the liquid crystal.

6. A liquid crystal display device according to claim 5, further comprising a second transparent reflection preventing layer disposed on the grooves to reflect light from one of directly from the light source and from the first transparent reflection preventing layer towards the liquid crystal and away from the grooves.

7. A liquid crystal display device according to claim 1, the stripe pattern of the color filter comprising a plurality of stripe-shaped color filters arranged in a short side direction, and the stripe pattern of the front light comprising a plurality of wedge-shaped grooves formed in a main surface thereof.

8. A liquid crystal display device according to claim 7, the wedge-shaped groove having two sides of unequal length.

9. A liquid crystal display device according to claim 7, the wedge-shaped grooves being formed successively.

10. A liquid crystal display device according to claim 7, the stripe pattern of the front light further comprising a surface substantially parallel to the transparent substrates formed between successive wedge-shaped grooves.

11. A liquid crystal display device according to claim 1, the stripe pattern of the color filter comprising a plurality of stripe-shaped color filters arranged in a short side direction, and the stripe pattern of the front light comprising a plurality of striped recesses formed in a main surface thereof and shaped substantially as a part of a spherical surface.

12. A liquid crystal display device according to claim 1, the stripe pattern of the color filter comprising a plurality of stripe-shaped color filters arranged in a short side direction, and the stripe pattern of the front light comprising a plurality of striped protrusions formed in a main surface thereof and shaped substantially as a part of a spherical surface.

13. A STN reflection-type liquid crystal display device according to claim 1.

14. An active matrix-type liquid crystal display device according to claim 1, further comprising a TFT element.

15. A liquid crystal display device comprising a liquid crystal display module including a front side, a liquid crystal layer, a color filter having a stripe pattern, a pair of opposing transparent substrates, and a front light having a stripe pattern, the liquid crystal layer and the color filter formed between the pair of opposing transparent substrates, and the front light mounted to the front side of the liquid crystal display module,
   wherein an optimum angle exists between the stripe pattern of the color filter and the stripe pattern of the front light and the optimum angle is determined by a combination of a width of the color filter, a distance between the color filter and an adjacent color filter, a width of each of the grooves, and a distance between adjacent grooves, said optimum angle being in the range of 90±10 degrees.

16. A liquid crystal display device according to claim 15, the stripe pattern of the color filter comprising a plurality of stripe-shaped color filters arranged in a short side direction and the stripe pattern of the front light comprising a plurality of grooves formed in a main surface thereof.

17. A liquid crystal display device according to claim 16, wherein each groove has a first inclined surface portion having a first length and a second inclined surface portion having a second length and the first length is smaller than the second length.

18. A liquid crystal display device according to claim 15, the front light further comprising a transparent light guide plate having a side end surface and a light source arranged on the side end surface.

19. A liquid crystal display device according to claim 18, further comprising a first transparent reflection preventing layer disposed on a surface of the front light opposing the grooves to reflect light directly from the light source towards the grooves and away from the liquid crystal.

20. A liquid crystal display device according to claim 19, further comprising a second transparent reflection preventing layer disposed on the grooves to reflect light from one of directly from the light source and from the first transparent reflection preventing layer towards the liquid crystal and away from the grooves.

21. A liquid crystal display device according to claim 15, the stripe pattern of the color filter comprising a plurality of stripe-shaped color filters arranged in a short side direction, and the stripe pattern of the front light comprising a plurality of wedge-shaped grooves formed in a main surface thereof.

22. A liquid crystal display device according to claim 21, the wedge-shaped groove having two sides of unequal length.

23. A liquid crystal display device according to claim 21, the wedge-shaped grooves being formed successively.

24. A liquid crystal display device according to claim 21, the stripe pattern of the front light further comprising a surface substantially parallel to the transparent substrates formed between successive wedge-shaped grooves.

25. A liquid crystal display device according to claim 15, the stripe pattern of the color filter comprising a plurality of stripe-shaped color filters arranged in a short side direction, and the stripe pattern of the front light comprising a plurality of striped recesses formed in a main surface thereof and shaped substantially as a part of a spherical surface.

26. A liquid crystal display device according to claim 15, the stripe pattern of the color filter comprising a plurality of stripe-shaped color filters arranged in a short side direction, and the stripe pattern of the front light comprising a plurality of striped protrusions formed in a main surface thereof and shaped substantially as a part of a spherical surface.

27. A STN reflection-type liquid crystal display device according to claim 15.

28. An active matrix-type liquid crystal display device according to claim 15, further comprising a TFT element.

* * * * *